Nov. 4, 1930.  A. S. MORRIS  1,780,308
ADJUSTABLE WATER SPRINKLER HOLDER
Filed Aug. 29, 1928
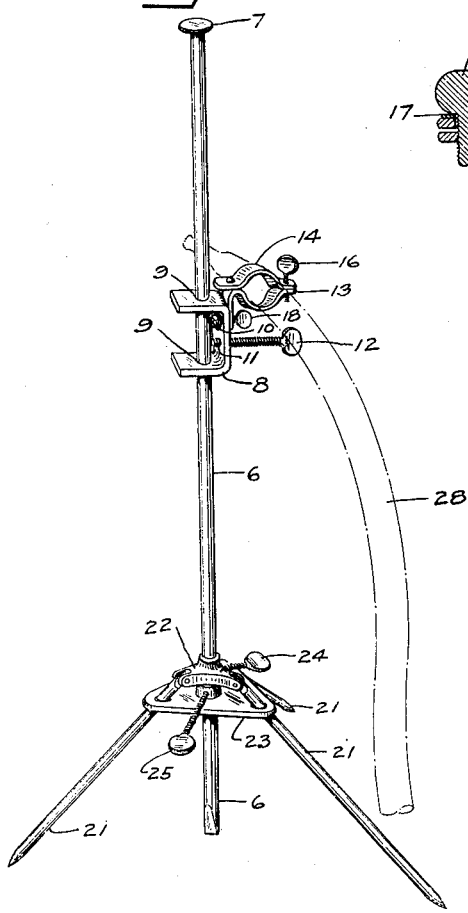
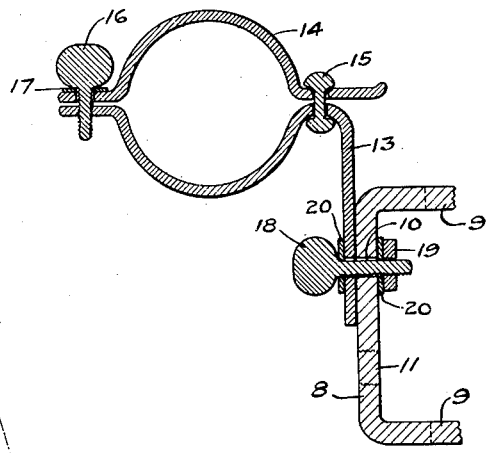
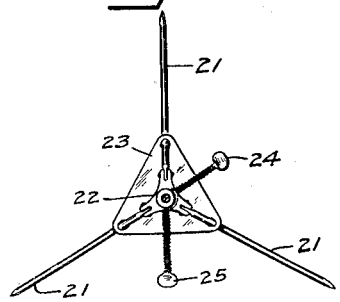
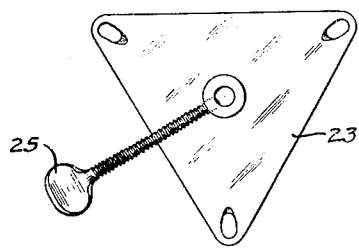
INVENTOR.
ALBERT S. MORRIS
BY
George F. Ballay
ATTORNEY.

Patented Nov. 4, 1930

1,780,308

UNITED STATES PATENT OFFICE

ALBERT S. MORRIS, OF OAKLAND, CALIFORNIA

ADJUSTABLE WATER-SPRINKLER HOLDER

Application filed August 29, 1928. Serial No. 302,775.

This invention relates to a simple, inexpensive and practical device for the purpose of providing a portable and adjustable water sprinkler holder that will hold the sprinkler in any suitable position and thus save much time and expense in sprinkling lawns, gardens and all such places where sprinkling is required.

It is an object of the invention, first, to provide a perpendicular rod that is constructed to be forced into the soil and to provide a tripod for supporting the rod; second, to provide an improved tripod consisting of a plurality of legs pivotally fastened to a tripod-head and projected through a spreader plate that is located below the tripod-head; third, to project the said perpendicular rod slidable through said tripod-head and spreader plate; fourth, to adjustably fasten the tripod-head to said perpendicular rod; fifth, to adjustably fasten the said spreader plate to the perpendicular rod; sixth, to provide a clamp for holding a water hose or sprinker or the equivalent; seventh, to fasten the clamp adjustable to the perpendicular rod, above the tripod; eighth, to preferably fasten the clamp to the tripod by providing a bracket that is fastened on to the said perpendicular rod and is adapted to be circumferentially adjustable and slidable thereon, the said clamp being fastened adjustable on to the said bracket.

The invention further consists in the particular combination, association and mode of operation of the various elements such as described in the following specification and possesses other features and objects of advantage, some of which, with the foregoing, will be made manifest in the following description of the preferred form of the invention which is illustrated in the drawings accompanying and forming part of the specification.

It is to be understood that it is not intended to limit the invention to the embodiment shown by said drawings and descriptions, as variations may be adapted within the scope of the invention as set forth in the claims.

In the accompanying drawings:

Figure 1 is a vertical longitudinal perspective view of one type of device involving the invention.

Figure 2 is a vertical transverse sectional view of a bracket and clamp used in the invention.

Figure 3 is an assembly top plan view of a spreader plate and tripod and shows the tripod legs projected through oblong holes that are provided in the spreader plate.

Figure 4 is a plan view of the tripod spreader plate used in the invention.

Referring to the figures and numerals thereof, the numeral 6 designates the central shaft or stem made preferably of solid metal rod for strength and finished smooth to allow for easy adjustment with other units of the assembly. The upper end of this rod is provided with a round plate 7 formed on or securely fastened to said rod, making it convenient to force lower or tapered end of rod downward by hand pressure applied to its upper surface. The lower end taper of the rod is made wedge shape to prevent turning when forced into soil or other material, thus assuring the fixed position of the invention when properly placed. Numeral 8 designates a U shaped metal bracket formed with sides at right angles to one another and provided with four holes 9—9, 10, 11, to allow for movement on the rod 6, action of set thumb screw 12 and mounting of bracket 13 on lower half of clamp assembly. Upper half of clamp assembly 14 is secured to lower half 13 by loose rivet 15 and thumb screw 16 provided with washer 17 and passing through smooth bore in 14 and engaged with threaded hole in 13 for the purpose of creating a tension grip of clamp on object which it is to hold fixed. Clamp assembly is held to U bracket 8 by means of thumb screw 18 passing through bracket arm 13, 8 and engaging with binding nut 19. The threaded portion of thumb screw 18 is flattened on one side and fitted with washers 20—20 so formed that they will not turn on flattened portion of thumb screw. This feature permits adjustment changes of position of clamp assembly with relation to 8 without loosening nut 19 as turning of washers 20 with thumb screw 18 and on the outer surfaces of 8 and 13 and causes assembly and thumb screw assembly to turn as one unit.

Holes 9—9 are in straight alignment with each other to permit either sliding or complete turning of clamp and bracket assembly on rod 6 except when thumb screw 12 is tightened or turned against side of 6 through threaded action provided by tapped hole 11, which construction holds clamp assembly in any desired fixed position desired. Rod 6 is held perpendicular by means of tripod assembly consisting of 3 legs 21 each of which is pivotally fastened to metal junction block or tripod-head 22 and metal spreader plate 23. The collar of 22 is drilled to permit free passage of 6 except when bound in place by threaded action of thumb screw 24 passing through collar at right angles to 6 and screwed against it. The collar of 23 is provided with thumb screw 25 working the same as 24 and serving a similar purpose.

From the foregoing it will be observed that the tripod spreader plate 23 is slidable on to the rod 6 and by moving the said plate down will cause the legs 21 to be spread further apart and by moving the said plate upward will cause the legs to be drawn close together, rigidly holding the legs 21 in different positions when the set screw 25 is tightened against the rod 6. Also by loosening set screws 24 and 25 the rod 6 may be moved to different vertical positions with respect to the tripod. In practice the lower wedge shaped end of the rod 6 is preferably brought down a distance below the lowermost end of the tripod legs, so that the rod 6 may be forced into the ground and thus be held in rigid position in the ground and also rigidly supported by the tripod. It will further be observed that the bracket 8 may be moved upward or downward to any suitable position, and also, circumferentially to any desired position. The clamp for holding the sprinkling hose 28 may also be adjusted to any vertical angle. It will be seen that the present invention is rigidly supported by a new and improved method, has an extremely wide range of adjustment and is a very useful device for many different purposes.

Having thus illustrated and described a certain form of construction and arrangement of parts pertaining to the invention, it is to be understood that the improvements may be embodied in any type of device to which the invention can be applied, and used for any purpose for which it can be applied, the present illustration not being utilized as indicating the only form of construction into which the parts may be made; and it is desired to include in this application for Letters Patent of the United States of America any and all patentable novelty that exists in the invention disclosed and all that comes within the range of the invention as set forth in the claims hereinafter mentioned.

What is claimed:

1. A device of the character described having in combination, a tripod consisting of a plurality of legs pivotally fastened on a tripod head; a rod vertically mounted in and through the tripod head and constructed to be slidable therein; a plate, having a plurality of holes for the legs to project through, mounted slidable on said rod underneath the tripod head; said tripod legs being mounted slidable in the holes of said plate; the holes in said plate being so arranged that the legs are spread apart when the plate is moved on the rod toward the tripod head and are moved toward each other when the plate is moved on the rod away from the tripod head; a holder mounted vertically and circumferentially adjustable on the rod above the tripod head; means for fastening the tripod head adjustable on said rod; and threaded means constructed to extend through a portion of the plate and be applied against the rod to hold the plate vertically adjustable directly on the rod.

2. A device of the character described having in combination, a tripod consisting of a plurality of legs pivotally fastened on a tripod head; a rod vertically mounted in and through the tripod head and constructed to be slidable therein; the bottom of said rod being tapered so it may be easily projected in the ground; a plate, having a plurality of holes for the legs to project through, mounted slidable on said rod underneath the tripod head; said tripod legs being mounted slidable in the holes of said plate; the holes in said plate being so arranged that the legs are spread apart when the plate is moved on the rod toward the tripod head and are moved toward each other when the plate is moved on the rod away from the tripod head; means for fastening the tripod head adjustable on said rod; means for holding the plate vertically adjustable on the rod; a channel shaped member mounted vertically adjustable on the rod, above the tripod head; and a clamp pivotally fastened on said channel shaped member.

In testimony that I claim the foregoing I have hereto set my hand this twenty-fourth day of August, 1928.

ALBERT S. MORRIS.